(12) United States Patent
Sakuma et al.

(10) Patent No.: US 6,323,786 B1
(45) Date of Patent: Nov. 27, 2001

(54) ABSOLUTE-VALUE ENCODER DEVICE

(75) Inventors: Hirokazu Sakuma; Takashi Okamuro; Yoichi Ohmura; Yukio Aoki; Toshikazu Satone, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/695,146

(22) Filed: Oct. 25, 2000

Related U.S. Application Data

(63) Continuation of application No. PCT/JP99/00938, filed on Feb. 26, 1999.

(51) Int. Cl.$^7$ .................................................. H03M 1/30
(52) U.S. Cl. ............................... 341/13; 341/7; 341/8; 341/6; 341/11; 341/13; 341/15; 341/111; 250/231.13; 250/231.14; 250/231.15; 250/231.16; 250/231.17; 250/231.18; 250/231.9
(58) Field of Search .......................... 341/6, 7, 8, 11, 341/13, 111, 15; 250/231.13, 231.14, 231.15, 231.16, 231.17, 231.18

(56) References Cited

U.S. PATENT DOCUMENTS

| 4,604,521 | * | 8/1986 | Takekoshi et al. | 250/231 SE |
|---|---|---|---|---|
| 4,704,523 | * | 11/1987 | Uchida | 250/231 SE |
| 5,012,238 | * | 4/1991 | Hayashi et al. | 341/15 |
| 5,825,307 | * | 10/1998 | Titus et al. | 341/13 |
| 5,852,413 | * | 11/1998 | Bacchi et al. | 341/13 |
| 5,880,683 | * | 3/1999 | Brandestini | 341/10 |
| 6,054,938 | * | 4/2000 | Nakajima et al. | 341/13 |

FOREIGN PATENT DOCUMENTS

| 4-320913 | 11/1992 | (JP) | G01B/21/00 |
|---|---|---|---|
| 62-297715 | 12/1987 | (JP) | G01D/5/245 |
| 4-41615 | 4/1992 | (JP) | G01D/5/245 |
| 6-241834 | 9/1994 | (JP) | G01D/5/245 |
| 10-221117 | 8/1998 | (JP) | G01D/5/245 |
| 8-313306 | 11/1996 | (JP) | G01D/5/36 |
| 8-334382 | 12/1996 | (JP) | G01D/5/36 |

* cited by examiner

Primary Examiner—Michael Tokar
Assistant Examiner—Lam T. Mai
(74) Attorney, Agent, or Firm—Sughrue, Mion, Zinn, Macpeak & Seas, PLLC

(57) ABSTRACT

An absolute-value encoder device for detecting a plurality of rotation quantities is disclosed. An A/B phase forming portion 610 forms an A-phase pulse signal and a B-phase pulse signal, based on light passing through a slit rotating together with a rotary shaft. One period of each of those pulse signals corresponds to one revolution of a rotary shaft. The A- and B-phase pulse signals are displaced in phase by 90° from each other. When an A/B-phase state detecting portion 640 detects a state change of each of those pulse signals, a clock forming portion 66 changes a frequency of a clock pulse signal to another frequency.

13 Claims, 8 Drawing Sheets

ABSOLUTE-VALUE ENCODER DEVICE

This application is a continuation of Ser. No. PCT/JP99/00938 filed Feb. 26, 1999.

BACKGROUND OF THE INVENTION

1. Field of the Invention

The present invention relates to an absolute-value encoder device capable of detecting a plurality of rotation quantities (detecting the number of revolutions), and more particularly the invention relates to an absolute-value encoder device which is driven to operate by a battery even at the power stoppage.

2. Description of the Related Art

This type of the absolute-value encoder device includes a rotary plate which rotates together with a rotary shaft. The rotary plate is provided with a light shut-off portion, such as a digital code pattern or an analog slit pattern. Light that is emitted from a light emitting element passes through the light shut-off portion, and is received by a light receiving element. As output signals of the light receiving element, two pulse signals as electrical signals (a first pulse signal, e.g., a pulse signal of phase A, and a second pulse signal, e.g., a pulse signal of phase B) are produced one pulse every complete shaft revolution. A phase difference between those two pulse signals is 90°.

FIG. 8 is a block diagram showing a conventional absolute-value encoder device. In the figure, reference numeral 66 is clock generating means, e.g., a clock forming portion, for generating a clock signal for an internal circuit. The clock forming portion 66 includes a selector 66a therein. The selector 66a selects high or low frequency of a clock signal output from the clock forming portion 66 depending on whether electric power is supplied from a main power supply (usually electric power formed by transforming and rectifying a commercial AC power is supplied) or a power supply other than the main power supply (usually supplied from a battery).

Reference numeral 60 is an LED lighting portion which turns on an LED the clock pulse is in "H" level, and reference numeral 610 is pulse signal forming means, e.g., A/B phase forming portion.

When the LED is lighted by the LED lighting portion 60, light emitted from the LED is irradiated on a slit of an encoder disc. Light that passes through the is incident on the A/B phase forming portion 610, which in turn forms a first pulse signal, e.g., an A-phase pulse signal, and a second pulse signal, e.g., a B-phase signal.

Reference numeral 63 is rotation-quantity counting means, e.g., a multi-rotation counter, for holding a current value representative of the number of revolutions of the shaft. When a change in the A-phase pulse signal is detected from the present clock pulse, and the B-phase pulse signal is in "H" level, the multi-rotation counter 63 performs its counting operation.

When the B-phase pulse signal is in "H" level, the multi-rotation counter 63 counts up upon detection of a leading edge of the A-phase pulse signal, and counts down upon detection of a trailing edge thereof. Those counting operations are performed when a clock pulse is received from the internal clock generator.

Also during a power stoppage or the like in which no electric power is supplied from the main power supply to the motor, it sometimes happens that external force is accidentally applied to the shaft and the shaft automatically rotates, and that the brake is accidentally released and the shaft will start to rotate by itself. To cope with such cases, the absolute-value encoder device is arranged such that its internal circuit is operated by a battery even when the main power supply supplies no electric power.

In the conventional device, in case where the electric power is supplied from the battery, to control the power consumption of the battery, as described above, the period of the clock pulse signal to drive the internal circuit is set to be long (the frequency of the clock pulse signal is set to be low). In a case that the electric power is supplied from the main power supply, the period of the clock pulse signal to drive the internal circuit is set to be short (the frequency of the clock pulse signal is set to be high).

When the clock frequency is relatively high as of a clock waveform (2) in FIG. 7 in a state that the frequency of the clock pulse signal has been changed to the low frequency, the next clock pulse comes in within a period that the A-phase pulse signal has changed its level to high level (referred to as "H" level) but the B-phase pulse signal is still in "H" level. Therefore, the multi-rotation counter 63 can normally count. Where the frequency of the clock pulse signal is relatively low as of a clock waveform (1), even when the A-phase pulse signal changes its level to an "H" level, the clock pulse is not applied to the multi-rotation counter within the period that the B-phase pulse signal is in "H" level. Therefore, the multi-rotation counter 63 cannot count normally.

The following relation holds between a rotational speed which allows the multi-rotation counter 63 to normally count and a clock frequency.

Clock frequency (Hz)=rotational speed (number of revolution/sec)×4

Where electric power is supplied from the battery, the follow problems arise. If the shaft is rotated at high speed in excess of that in the above equation, the multi-rotation counter 63 does not count normally. As a result, the absolute-value encoder device erroneously detects a plurality of rotation quantities. Further, if the frequency of the clock pulse signal is previously set at a high frequency, the battery is fast consumed.

SUMMARY OF THE INVENTION

Accordingly, an object of the present invention is to provide an absolute-value encoder device in which in the case that the electric power is supplied from a battery, its dissipation of the electric power is small and the erroneous detection of the plurality of rotation quantities is prevented, and which the device may be manufactured without great increase of the cost.

The present invention provides an absolute-value encoder device which comprises: a rotary disc rotating with a shaft; pulse signal forming means for producing first and second pulse signals shifted about 90° from each other, each of the pulse signal being generated one pulse for each complete revolution of the shaft, based on light having passed through a light shut-off portion provided on the rotary disc, four angular segments into which angular positions of one revolution of the shaft are divided being specified by the first and second pulse signals; clock generating means for generating a clock pulse signal; and rotation quantity counting means which counts, based on the clock pulse signal, when the first pulse signal changes its logic level in a state that the second pulse signal is in a predetermined logic level, and holds the present value of the number of revolutions of the shaft; wherein when either of the two pulse signals changes its logic level, the clock generating means changes the frequency of the clock pulse signal to a high frequency. With such an arrangement, it is prevented that the encoder device erroneously detects a plurality of rotation quantities when electric power is supplied from a battery to the absolute-value encoder device. This is achieved without great increase of cost. Further, consumption of the battery is reduced.

The absolute-value encoder device further comprises number-of-clock counting means for counting clock pulses. The number-of-clock counting means is placed to a reset state at a start position of each of the four angular segments. In the decoder device, when a count value of the number-of-clock counting means exceeds a preset value, the clock generating means changes the frequency of the clock pulse signal to a low frequency. Where electric power is supplied to the encoder device from the battery, when the shaft stops or rotates at extremely low speed, the clock pulse signal becomes low in frequency. As a result, the battery consumption is further reduced.

In the absolute-value encoder device, the pulse signal forming means outputs a predetermined number of pulse signals in addition to the first and second pulse signals, the clock generating means changes the frequency of the clock pulse signal to a high frequency when any of the first and second pulse signals and the predetermined number of pulse signals changes its logic level, and either of the leading and trailing edges of each of the predetermined number of pulse signals leads an angular position where the first pulse signal changes its logic level by a predetermined angle of 90° or smaller where the second pulse signal is in a predetermined logic level, and either of the leading and trailing edges of each of the predetermined number of pulse signals lags an angular position where the first pulse signal changes its logic level by a predetermined angle of 90° or smaller where the second pulse signal is in a predetermined logic level. With such an arrangement, it is more reliably prevented that the encoder device erroneously detects a plurality of rotation quantities when electric power is supplied from a battery to the absolute-value encoder device. This is achieved without great increase of cost. Further, consumption of the battery is reduced.

The present invention also provides an absolute-value encoder device which comprises: a rotary disc rotating with a shaft; pulse signal forming means for producing first, second, third and fourth pulse signals shifted about 45° from one another, each of the pulse signal being generated one pulse for each complete revolution of the shaft, based on light having passed through a light shut-off portion provided on the rotary disc, eight angular segments into which angular positions of one revolution of the shaft are divided being specified by the four pulse signals; clock generating means for generating a clock pulse signal; select means for selecting one of the second, third and fourth pulse signals based on the angular segment selected from among the eight angular segments; and rotation quantity counting means which counts, based on the present clock pulse of the clock pulse signal, when the first signal changes its logic level in a state that the pulse signal selected by the select means is in a predetermined logic level, and holds the present value of the number of revolutions of the shaft. With such an arrangement, in the case of supplying electric power from a battery, the encoder device is prevented from erroneously detecting a plurality of rotation quantities when the shaft starts to rotate at a relatively large angular acceleration without great increase of cost. Further, consumption of the battery is reduced.

In the absolute-value encoder device, the clock generating means for generating a cock pulse signal changes the frequency of the clock pulse signal to a high frequency when any of the four pulse signals changes its logic level. With such an arrangement, in the case of supplying electric power from a battery, the encoder device is prevented from erroneously detecting a plurality of rotation quantities when the shaft starts to rotate at a relatively large angular acceleration and when it rotates thereafter, without great increase of cost. Further, consumption of the battery is reduced.

The absolute-value encoder device further comprises number-of-clock counting means for counting clock pulses. The number-of-clock counting means is placed to a reset state at a start position of each of the eight angular segments. In the encoder device, when a count value of the number-of-clock counting means exceeds a preset value, the clock generating means changes the frequency of the clock pulse signal to a low frequency. Where electric power is supplied to the encoder device from the battery, when the shaft stops or rotates at extremely low speed, the clock pulse signal becomes low in frequency. As a result, the battery consumption is further reduced.

In the absolute-value encoder device, the pulse signal forming means includes four comparators, and generates signals of which the voltage amplitudes vary in sine and cosine wave go forms for one period through one complete revolution of the shaft, based on light having passing through the light shut-off portion, and forms four pulse signals, first to fourth pulse signals, by using the four comparators based on the generated signals. The arrangement mentioned above reduces the number of required parts in the light emitting and receiving portions, and hence reduces cost to manufacture the device. Further, it prevents degradation of the reliability of the resultant device.

In the absolute-value encoder device, the rotary disc includes four light shut-off portions, the amounts of light having passed through the four light shut-off portions are displaced from one another by about 45°, each of the four light shut-off portions varies in a one-pulse shape through one revolution of the shaft, and the pulse signal forming means outputs four signals, first to fourth pulse signals, based on the amounts of the light having passed. The useful result of the arrangement is that the device is simple in construction, and trouble shooting is easy.

In the absolute-value encoder device, the pulse signal forming means outputs a total of six pulse signals, a fifth pulse signal and a sixth pulse signal in addition to the four pulse signals, and the fifth pulse signal leads the first pulse signal by an angle of 45° or smaller and the sixth pulse signal lags the first pulse signal by an angle of 45° or smaller. Therefore, in the case of supplying electric power from a battery, the encoder device is prevented from erroneously detecting a plurality of rotation quantities when the shaft starts to rotate at a relatively larger angular acceleration without great increase of cost. Further, consumption of the battery is reduced.

In the absolute-value encoder device, the clock generating means for generating a cock pulse signal changes the frequency of the clock pulse signal to a high frequency when any of the four pulse signals changes its logic level. Therefore, in the case of supplying electric power from a battery, the encoder device is prevented from erroneously detecting a plurality of rotation quantities when the shaft starts to rotate at a larger angular acceleration and when it rotates thereafter, without great increase of cost. Further, consumption of the battery is reduced.

The absolute-value encoder device further comprises number-of-clock counting means for counting clock pulses. The number-of-clock counting means is placed to a reset state at a start position of each of the eight angular segments. In the encoder device, when the number of clock pulses exceeds a preset value, the clock generating means changes the frequency of the clock pulse signal to a low frequency. Where electric power is supplied to the encoder device from the battery, when the shaft stops or rotates at extremely low speed, the clock pulse signal becomes low in frequency. As a result, the battery consumption is further reduced.

In the absolute-value encoder device, the pulse signal forming means includes six comparators, and generates signals of which the voltage amplitudes vary in sine and cosine wave forms for one period through one complete revolution of the shaft, based on light having passing through the light shut-off portion, and forms six pulse signals, first to sixth pulse signals, by using the four comparators based on the generated signals The arrangement mentioned above reduces the number of required parts in the light emitting and receiving portions, and hence reduces cost to manufacture the device. Further, it prevents degradation of the reliability of the resultant device.

In the absolute-value encoder device, the rotary disc includes first to fourth light shut-off portions, the amounts of light having passed through the first to fourth light shut-off portions being displaced from one another by about 45°, each of the first to fourth light shut-off portions varying in a one-pulse shape through one revolution of the shaft, and the rotary disc further includes a fifth light shut-off portion of which the amount of light having passed therethrough leads the corresponding one of light having passed through the first light shut-off portion by an angle of 45° or smaller, and a sixth light shut-off portion of which the amount of light having passed therethrough lags the corresponding one of light having passed through the first light shut-off portion by an angle of 45° or smaller, and the pulse signal forming means outputs four signals, first to sixth pulse signals, based on the amounts of the light having passed through the six light shut-off portions. The arrangement mentioned above reduces the number of required parts in the light emitting and receiving portions, and hence reduces cost to manufacture the device. Further, it prevents degradation of the reliability of the resultant. device.

DETAILED DESCRIPTION OF THE PRESENT INVENTION

Embodiment 1

Figure 1:
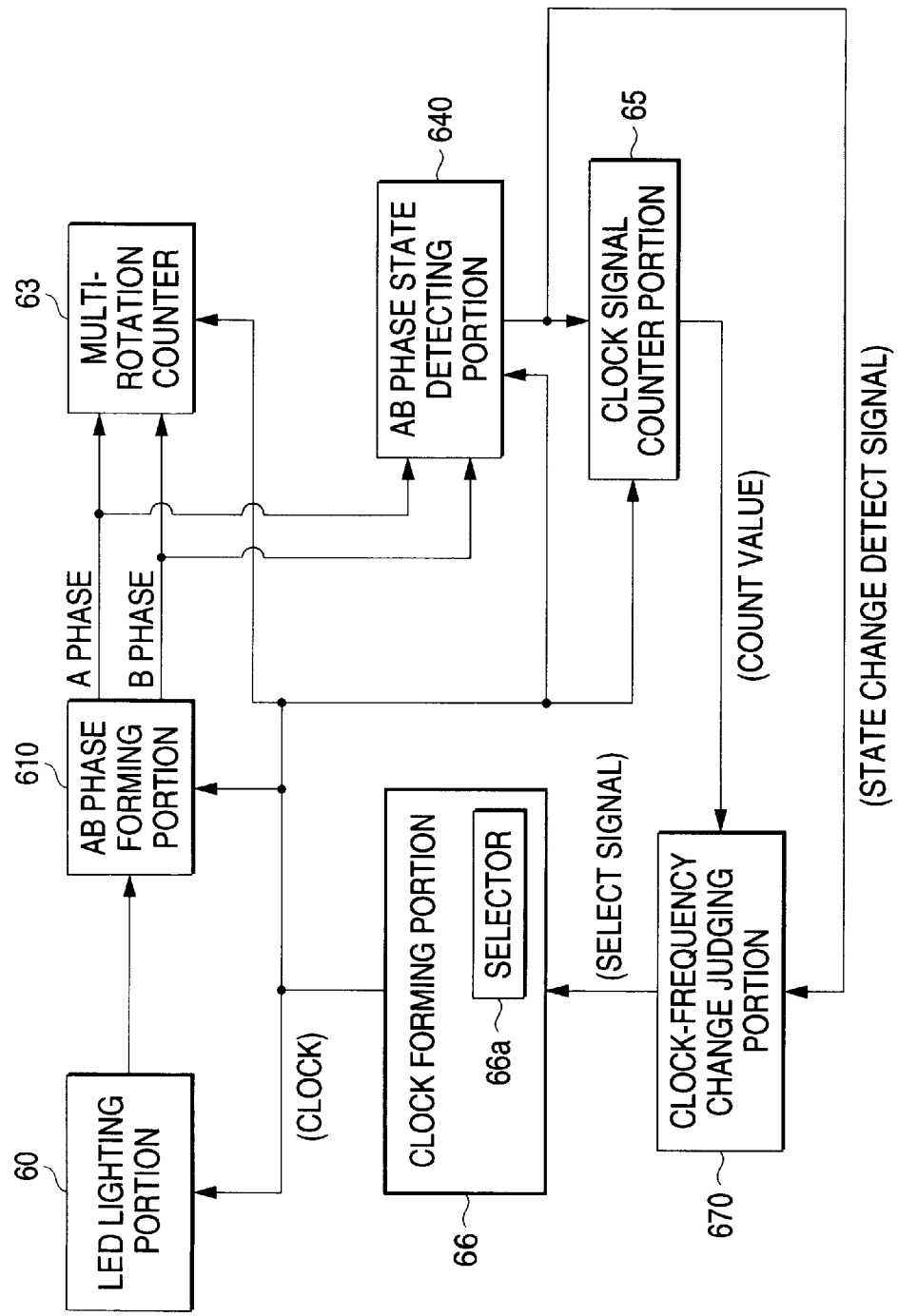
FIG. 1 is a block diagram showing an absolute-value encoder device which is an embodiment 1 of the present invention.

FIG. 1 is a block diagram showing an absolute-value encoder device to which an embodiment 1 of the present invention is applied. In the figure, two pulse signals, an A-phase pulse signal and a B-phase pulse signal, which are formed by an A/B phase forming portion 610, are input to an A/B-phase state detecting portion 640. In turn, the A/B-phase state detecting portion 640 detects an angular segment in which the present angular position of the shaft is located, the angular segment being one of four angular segments that can be specified by those two pulse signals, and presence or absence of a level change in any of the two pulse signals (whether or not the angular segment was changed to another).

Reference numeral 65 is number-of-clock means, e.g., a clock signal counter portion. When an angular segment was changed to another, the cock signal counter portion 65 is reset, and counts the number of clock pulses in one and the same angular segment. The result of the counting is input to a clock-frequency change judging portion 670, which in turn judges whether or not the frequency of the clock pulse signal is to be changed to a low frequency thereof depending on whether or not a count value of the cock signal counter portion 65 is in excess of a predetermined value. If the frequency is to be changed to a low frequency, a select signal for selecting the low frequency is input from the clock-frequency change judging portion 670 to the clock forming portion 66.

When an angular segment change is detected by the A/B-phase state detecting portion 640, a detect signal is input to the clock-frequency change judging portion 670, and a select signal for changing the clock frequency to a high frequency is input from the clock-frequency change judging portion 670 to the clock forming portion 66.

When a change in the A-phase pulse signal is detected at the present clock pulse, if the B-phase pulse signal is in "H" level, the multi-rotation counter 63 performs its counting operation.

When the A-phase pulse signal changes its level from "L" level to "H" level in a state that the B-phase pulse signal is in "H" level, it is recognized that it is forwardly rotated, the multi-rotation counter 63 counts up. When the A-phase pulse signal changes its level from "H" level to "L" level, it is recognized that it is reversely rotated, the multi-rotation counter 63 counts down. In a state that the B-phase pulse signal is in "L" level, even if the A-phase pulse signal changes in level, the multi-rotation counter 63 does not count.

As described above, in the embodiment 1 of the present invention, when the angular segment in which the present clock pulse appears is different from that in which the preceding clock pulse appears in the case that the electric power is supplied from the battery, the frequency of the clock pulse signal is changed to the high frequency.

In the case where the electric power is supplied from the battery, when it starts to rotate at a low angular acceleration, even if the clock pulse signal is low in frequency, there is no chance that the logic level of the A-phase pulse signal and that of the B-phase pulse signal concurrently change during one period of the clock pulse signal. In this case, neither the A-phase pulse signal nor the B-phase pulse signal changes its logic level, but either the A-phase pulse signal or the B-phase pulse signal changes its logic level. Accordingly, as in the case of the conventional device, all a designer has to do is that the multi-rotation counter 63 does not count until the A-phase pulse signal changes its logic level in a state that the B-phase pulse signal is in "H" level. At this time, the angular segment is also changed to another by the logic level change of the A-phase pulse signal. Therefore, if the frequency of the clock pulse signal is low, it is change to the high frequency. Subsequently, the multi-rotation counter 63 normally counts even if it is rotated at high speed.

When the rotational speed becomes slow and the number of clock pulses in one and the same angular segment has reached a predetermined set value N, the frequency of the clock pulse signal is changed to the low frequency again.

When the clock pulse signal is at the low frequency (period=TL), the number S of clock pulses (the number of revolutions) is given by:

$$S=(60/N_L) \times (1/4) \times (1/T_L)$$

where $N_L$ (rpm): rotational speed ensuring the normal counting operation by the counter.

A frequency-change judgement value at which the frequency of the clock pulse signal is changed to the low frequency is selected to be a value somewhat larger than the number S of clock pulses, allowing for variations of the angular segment width, the clock frequency and the like.

As described above, the embodiment 1 of the invention succeeds in reducing the power dissipation in the case that the electric power is supplied from the battery. Further, in the embodiment, if the angular acceleration is small at the time of starting, the multi-rotation counter 63 normally counts even if, after it starts its rotation, it is rotated at high-speed.

Figure 3:
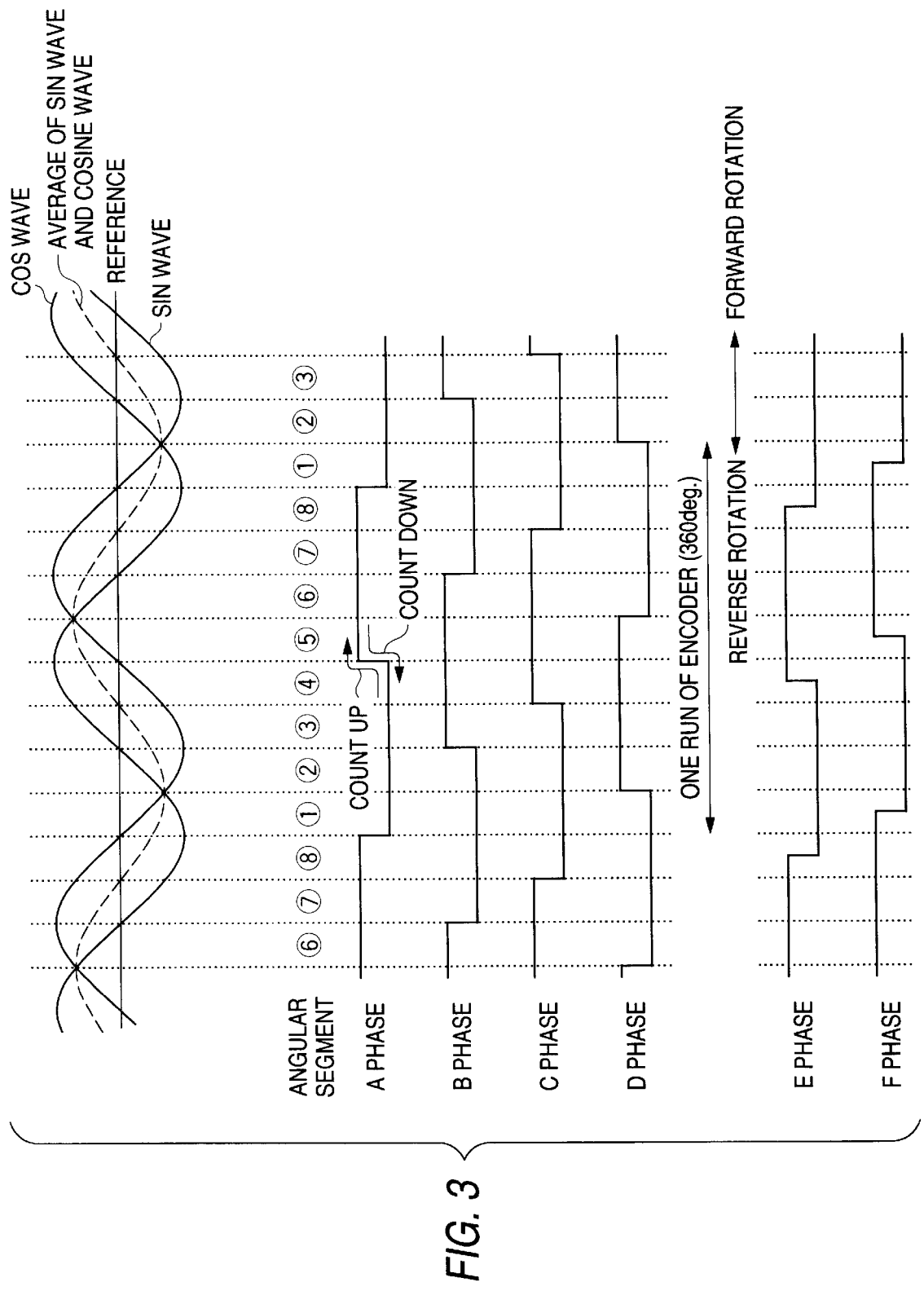
FIG. 3 is a timing diagram showing an operation of the absolute-value encoder device of each of embodiments 1 to 2 of the invention.

Thus, in the case where the counting operation of the multi-rotation counter 63 is performed using only two signals (A-phase and B-phase pulse signals), when the shaft is forwardly rotated, if following the arrival of the final clock pulse in an angular segment preceding an angular segment (5), the subsequent clock pulse appears in the angular segment (7) or any of the subsequent ones in the operation timing diagram of FIG. 3, the multi-rotation counter 63 does not count normally. As a result, the operation of detecting the plurality of rotational quantities will not be performed normally.

When the shaft is accelerated at a fixed acceleration a in the forward direction at the start time of its rotation, a position where it rests is within a region of the angular segment (3) close to a boundary between the angular segments (2) and (3). After starting, the present angular position of the shaft is positioned just before angular segment (5), at the time that the final clock pulse located at a position preceding to the angular segment (5) arrives (an elapsing time from the start time to this time is Ta) When it is located at a position subsequent to the angular segment (5) at the time that the next clock pulse appears (an elapsing time from the start time to this time is Tb), viz., when the follow relations hold $$(1/2) \cdot \alpha \cdot Ta^2 = 1/4 (rotation)$$

$$(1/2) \cdot \alpha \cdot Tb^2 = 1/2 (rotation),$$

the multi-rotation counter 63 will erroneously count at the smallest acceleration $\alpha$.

Since $Tb=Ta+T_L$, when arranging those three equations, then we have $$\alpha = \{1-(1/\sqrt{2})\}^2 / T_L^2 (rotation/sec^2)$$

Here, $\alpha$ is a tolerable angular acceleration.

In the description given above, the two pulse signals are used, and the angular segment is changed from one segment to another every 1/4 turn.

In an alternative, the angular segment may be changed every 1/2 turn or for each complete turn. In this case, the frequency-change judgement value is also set to a correspondingly value. In another alternative, "n" is set at an integer of 3 or greater, an "n" number of pulses are used, and the angular segment may be changed every 1/2n turn.

Embodiment 2

In an absolute-value encoder device according to art embodiment 2 of the present invention, a third pulse signal, e. g., a C-phase pulse signal, and a fourth pulse signal, e.g., a D-phase pulse signal, are used in addition to the A-phase and B-pulse signals.

Figure 2:
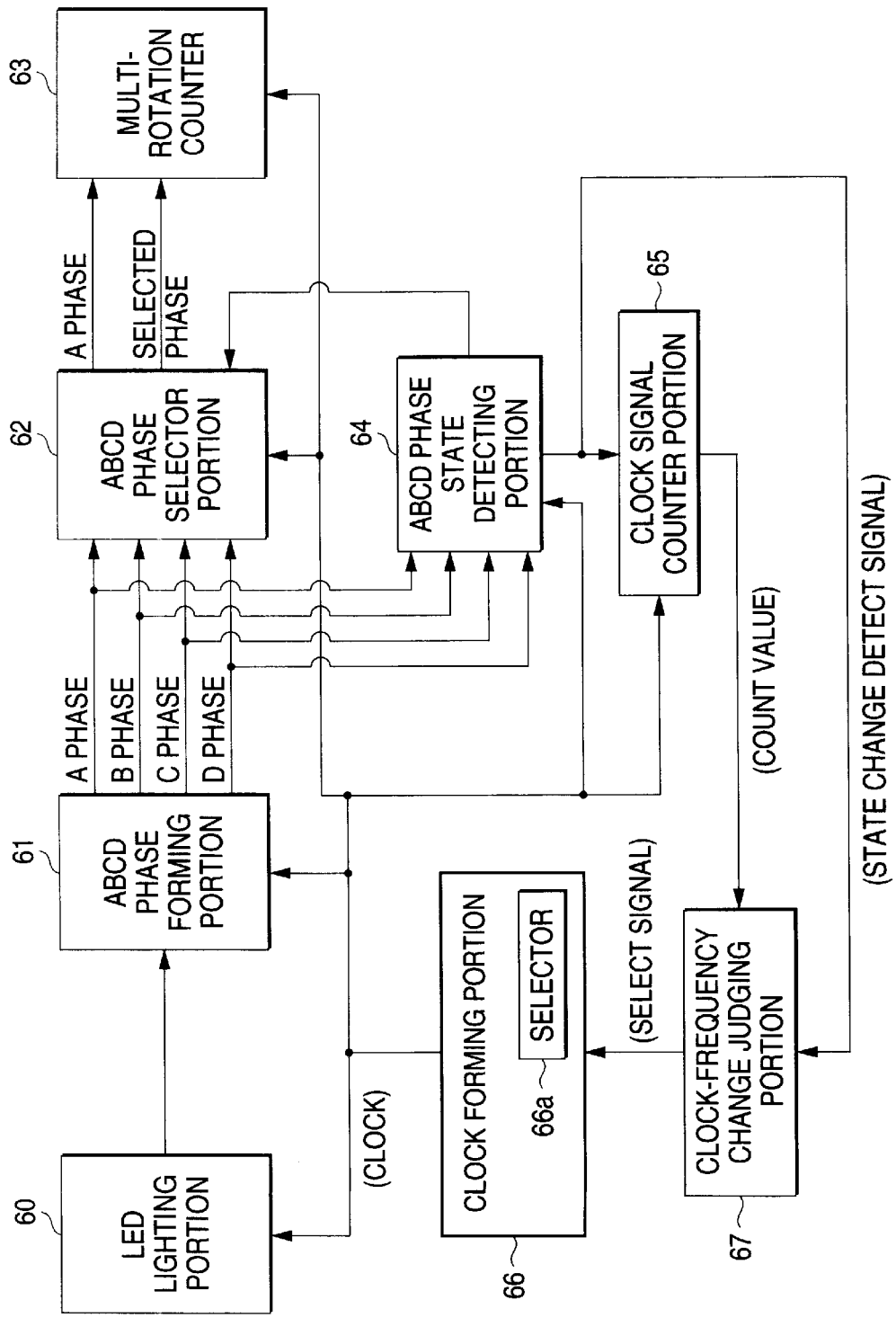
FIG. 2 is a block diagram showing an absolute-value encoder device which is an embodiment 2 of the present invention.

FIG. 2 is a block diagram showing an absolute-value encoder device to which the embodiment 2 is applied. In the figure, reference numeral 61 is an A-to-D phase forming portion.

A LED is lighted by the LED lighting portion 60, and light emitted from the LED is irradiated onto a slit of a disc of the encoder. Light passed through the slit of the encoder disc is input to the A-to-D phase forming portion 61 which in turn forms A-, B-, C- and D-phase pulse signals. Where those four pulse signals are used, it is allowed that the angular positions within one complete turn of the shaft are grouped into eight angular segments, and those segments are specified by using those four pulse signals.

Reference numeral 64 designates an A-to-D-phase state detecting portion. Those four pulse signals are input to the A-to-D-phase state detecting portion 64. The A-to-D-phase state detecting portion 64 detects the angular segment in which the present angular position of the shaft is located, the angular segment being one of four angular segments, and presence or absence of a level change in any of the four pulse signals (whether or not the angular segment was changed to another).

Reference numeral 65 is a clock signal counter portion. When an angular segment was changed to another, the clock signal counter portion 65 is reset, and counts the number of clock pulses within one and the same angular segment. The result of the counting is input to a clock-frequency change judging portion 67, which in turn judges whether or not the frequency of the clock pulse signal is to be changed to a low frequency thereof depending on a count value of the clock signal counter portion 65. When the count value is larger than the set value N, a select signal for selecting the low frequency is input from the clock-frequency change judging portion 67 to the clock forming portion 66.

When the change of the angular segment to another angular segment is detected by the A-to-D-phase state detecting portion 64, then the resultant detect signal is input to the clock-frequency change judging portion 67, and a signal for changing the clock frequency to a high frequency is input to the clock forming portion 66.

The A-to-D-phase state detecting portion 64 detects states of the A-, B-, C- and D-phase pulse signals at the preceding and the present clock pulses, and outputs the detection result to the A-to-D-phase selector portion 62. The A-to-D-phase selector portion 62, as will be described later, selects any of those phase pulse signals other than the A-phase pulse signal according to Table 1 based upon the angular segment in which it was when the previous clock pulse was applied. And it outputs the selected phase pulse signal and the A-phase pulse signal to the multi-rotation counter 63. The multi-rotation counter 63 counts when a logic level change of the A-phase pulse signal is detected at the time that the present clock pulse appears, and if the logic level of the selected phase pulse signal is "H" level.

The A-to-D-phase selector portion 62 and the A-to-D-phase state detecting portion 64 form select means.

Next, this will be described in detail with reference to FIG. 3. In FIG. 3, the A-, B-, C- and D-pulse signals are pulse signals whose periods are each equal to the period of the rotation of the encoder. In each of those pulse signals, one pulse appears for one period. In the forward rotation, the B-phase pulse signal leads the A-phase pulse signal by about 90°; the C-phase pulse signal leads the same by about 45° and the D-phase pulse signal lead the same by about 135°.

When the A-phase pulse signal changes its logic level from "L" level to "H" level under the condition that the clock pulse signal is low in frequency and any of the B-, C- and D-phase pulse signals is in "H" level, the multi-rotation counter 63 considers that it was forwardly rotated, and counts up based on this. When the A-phase pulse signal changes its logic level from "H" level to "L" level, the multi-rotation counter 63 considers that it was reversely rotated, and counts down based on the judgement.

The multi-rotation counter 63 does not count even if the A-phase pulse signal changes in logic level in a state that the selected signal is in "L" level.

Selection of which of the B-, C- and D-phase pulse signals is carried out according to the contents of Table 1 while based on the angular segment in which the preceding clock pulse appears, the segment being one of the angular segments (1) to (8) shown in FIG. 3, or the angular segment in which the present clock pulse appears.

When the angular segment in which the preceding clock pulse appears is different from that in which the present clock pulse appears, it considers that the shaft was rotated, and the clock frequency will be changed to the high frequency.

Next, detailed description will be given about a case where it having been standstill is accelerated at large angular acceleration when electric power is supplied from a battery.

In this case, it sometimes happens that none of those four pulse signals remains unchanged in level during a period from the start time to the time that the preceding clock pulse appears, and at the time that the present clock pulse comes in, both the A- and B-phase pulse signals have been changed in their signal states. In the embodiment 2 of the invention, also in such a situation, the multi-rotation counter 63 is able to normally count if the angular acceleration is within a predetermined range as will be described later.

In the embodiment 2 of the invention, in both the forward and reverse rotations, the conditions for the counting by the multi-rotation counter 63 when the present clock pulse comes in may be altered according to the contents of Table 1 below, while depending on the angular segment in which the previous clock pulse appears.

TABLE 1

| Position (angular segment) of the shaft when the preceding clock pulse appears | (1) | (2) | (3) | (4) | (5) | (6) | (7) | (8) |
|---|---|---|---|---|---|---|---|---|
| The multi-rotation counter counts provided that when the present clock pulse appears, the phase pulse signal in the lower entry is in "H" level and a state of the phase pulse signal in the upper entry has been changed from a state of the signal when the preceding clock pulse appears | A<br>D | A<br>B | A<br>B | A<br>C | A<br>D | A<br>B | A<br>B | A<br>C |

The multi-rotation counter 63 counts up when a leading edge of the A-phase pulse signal is detected in a state the phase pulse signal in the lowermost entry in Table 1 is in "H" level, and counts down when its trailing edge is detected.

In the embodiment 2, in the forward rotation, if the preceding clock pulse is applied in the angular segment (4) and the subsequent clock pulse is applied in any of the angular segments (5), (6) and (7), the multi-rotation counter 63 can normally count since the counting operation of the multi-rotation counter 63 is performed using the A- and C-phase pulse signals. In a case where the preceding clock pulse is applied in the angular segment (4), its speed is high at positions near the angular segments (5), (6) and (7), and the next clock pulse is not applied while it passes the angular segments (5), (6) and (7), it is not detected that it passed the angular segments (5), (6) and (7), and the multi-rotation counter 63 cannot count normally.

Figure 4:
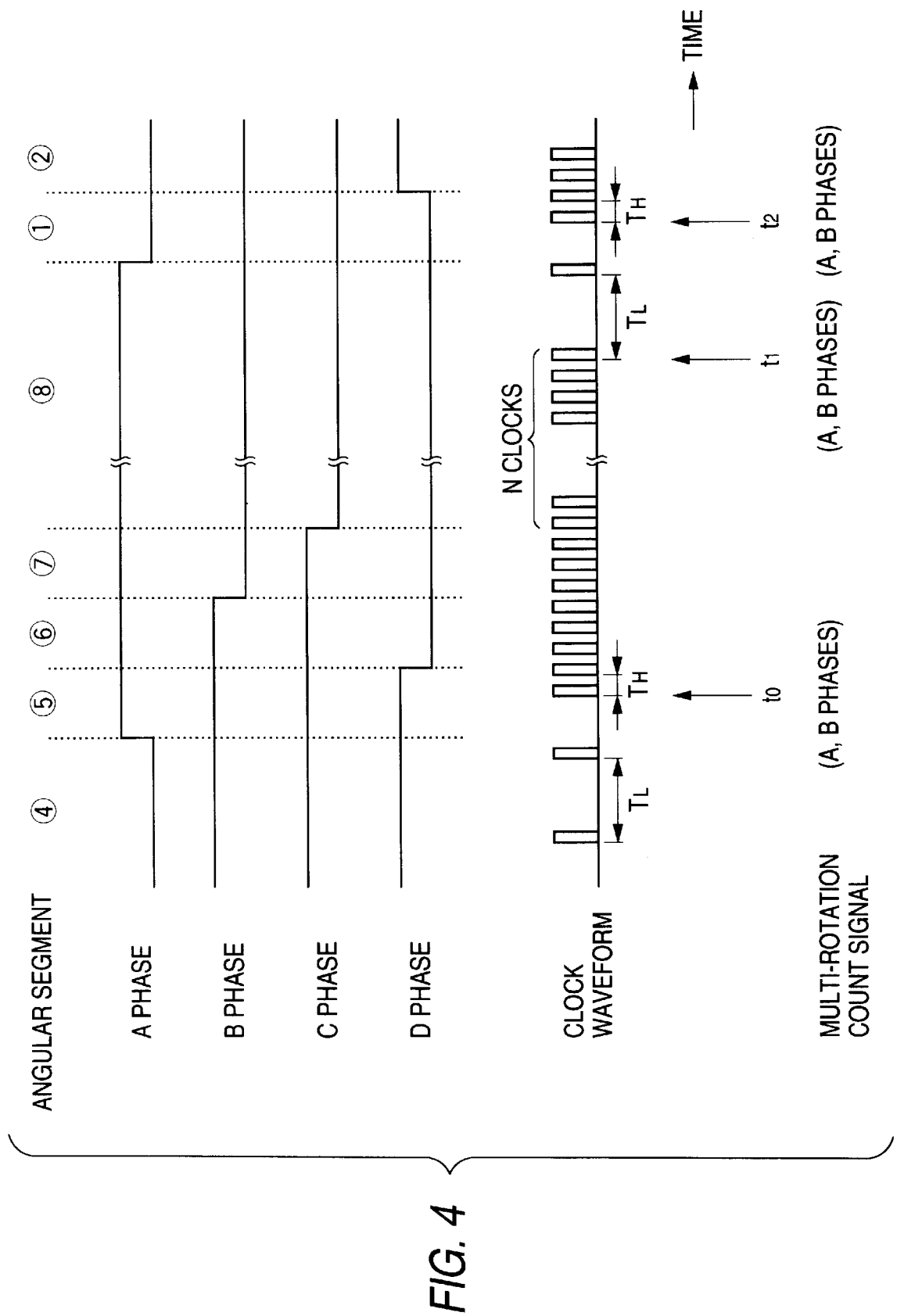
FIG. 4 is a timing diagram useful in explaining how a plurality of rotation quantities are normally detected by the absolute-value encoder device of the embodiment 2 when an angular acceleration is small at the time of starting.

FIG. 4 is a timing diagram showing such a device operation that it starts its rotation in the forward direction at small angular acceleration, and the angular segment is changed from the segment (4) to the segment (5) during one period of the clock pulse. In this case, as in the case using two pulse signals, the multi-rotation counter 63 normally counts and the frequency of the clock pulse is changed to the high frequency.

Figure 5:
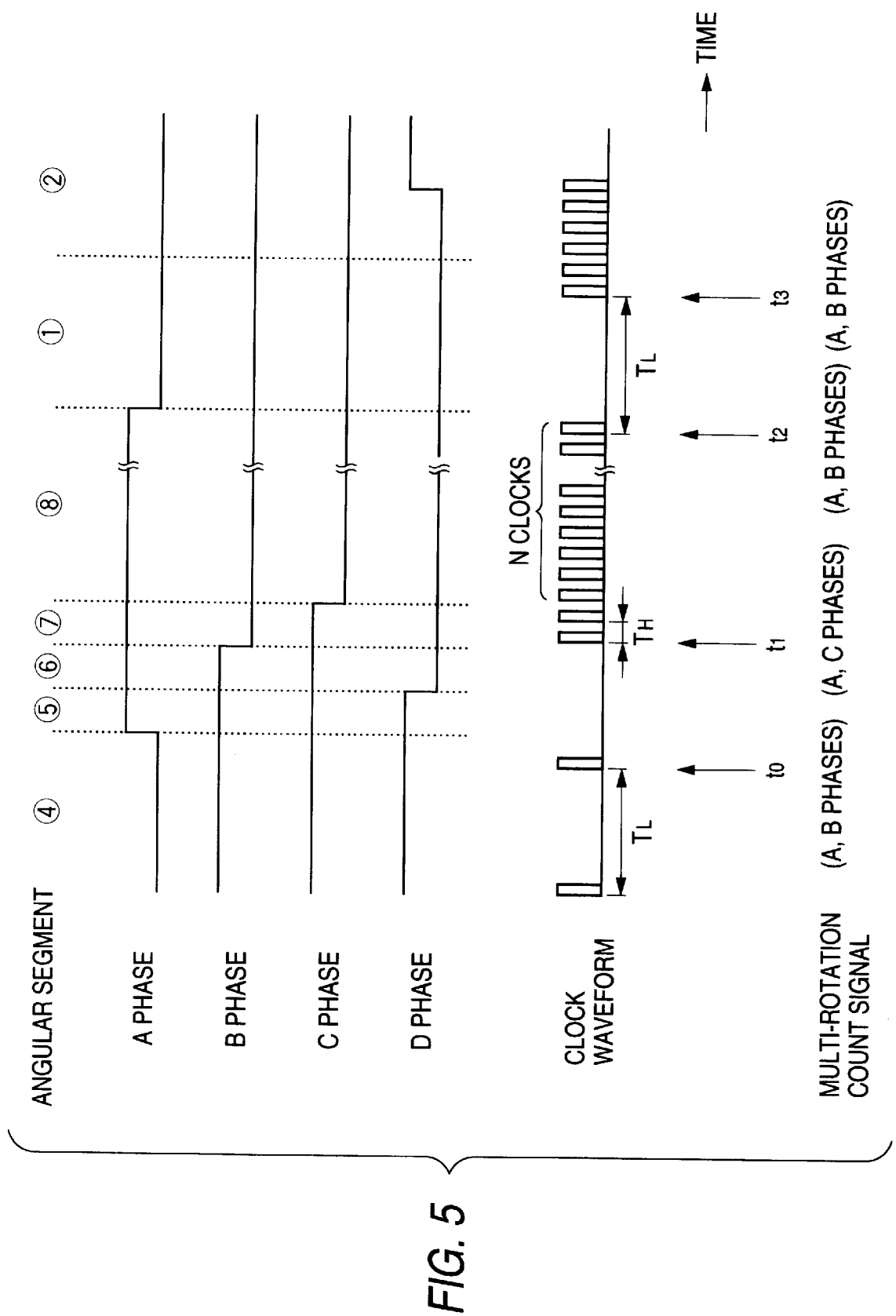
FIG. 5 is a timing diagram useful in explaining how a plurality of rotation quantities are normally detected by the absolute-value encoder device of the embodiment 2 also when an angular acceleration is large at the time of starting.

FIG. 5 is a timing diagram showing such a device operation that in a case where the four pulse signals are used, and the counting operation is based on the contents of Table 1, it starts its rotation in the forward direction at large angular acceleration, the angular segment is changed from the segment (4) to the segment (7) during one period of the clock pulse.

In the figure, at a time point t1 that the present clock pulse is applied, the A- and B-phase pulse signals are both changed in logic level when comparing those at a time point t0 at which the preceding clock pulse is applied. According to Table 1, in this case, the counting operation of the multi-rotation counter 63 is performed based on a logic level state of the C-phase pulse signal and a change of a logic level of the A-phase pulse signal. In the angular segment (7), at a time point t1 at which the present clock pulse appears, the A-phase pulse signal is changed in logic level when comparing with that at a time point t0 at which the preceding clock pulse appears. However, a logic level of the C-phase pulse signal is left unchanged. Therefore, the multi-rotation counter 63 normally counts at the time point t1 at which the preceding clock pulse appears.

Further, the angular segment has been changed to another. Then, the frequency (of which the period is TH) of the clock pulse is changed to the high frequency at a time point t2 at which the present clock pulse arrives and the subsequent time points.

Subsequently, it is judged that it is put in a low speed rotating state at a time point t2 at which the number of clock pulses within the angular segment (8) in FIG. 5 exceeds a set value N, and based on the judgement, the frequency of the clock pulse is changed to a low frequency (of which the period is TL) in preparation for a case where the next angular acceleration will change.

Assuming that a rotational speed ensuring a normal counting by the counter is NL (rpm) in a state that the clock pulse is at the low frequency (of which the period is TL), then the number S of clock pulses (the number of rotations) pulses (the number of revolutions) within one and the same angular segment (⅛ revolution) is given by $$S=(60/N_L) \times (\tfrac{1}{8}) \times (1/T_L)$$

A frequency-change judgement value at which the frequency of the clock pulse signal is changed to the low frequency is selected to be a value somewhat larger than the number S of clock pulses (the number of revolutions), allowing for variations of the angular segment width, the clock frequency and the like.

With the arrangement mentioned above, the amount of electric power dissipated at the power stoppage is controlled. Even when a rotating state of it is rapidly varied from a standstill state, the multi-rotation counter 63 normally performs its counting operation, and hence the rotation quantity of it is normally detected.

In a case where the shaft is accelerated in the forward direction at a constant acceleration at the time of its rotation start, when a position at which the present angular position of the shaft rests is within the angular segment (4) close to the boundary between the angular segments (3) and (4) in the operation timing diagram of FIG. 3, when it is positioned immediately before the angular segment (5) at the time that the final clock pulse arrives at a position within a range from the start of its rotation to the angular segment (5) (an elapsing time from the starting time to this time is Ta), and when at the time that the subsequent clock pulse arrives (an elapsing time from the start time of its rotation to this time is Tb), it is positioned immediately after the angular segment (7) (within a region of the angular segment (8) close to the boundary between the angular segments (7) and (8)), that is, when the follow relations hold, $$(\tfrac{1}{2}) \cdot \alpha \cdot Ta^2 = \tfrac{1}{8}(\text{rotation})$$

$$(\tfrac{1}{2}) \cdot \alpha \cdot Tb^2 = \tfrac{1}{2}(\text{rotation}),$$

the multi-rotation counter 63 will erroneously count at the smallest acceleration α.

Since Tb=Ta+$T_L$, when arranging those three equations, then we have $$\alpha = \{1-(\tfrac{1}{2})\}^2/T_L^2 (\text{rotation/sec}^2)$$

Here, α is a tolerable angular acceleration when the acceleration at the start of shaft rotation is constant.

Accordingly, in the case using only four pulse signals, the tolerable angular acceleration is increased about 2.9 times as large as that in the case using only two pulse signals.

Next description will be given about a method of forming the A-, B-, C- and D-phase pulse signals by the embodiment 2.

An encoder includes a rotary plate, e.g., a code disc, which rotates together with the rotary shaft. Light emitted from light emitting means (not shown) is irradiated on the code disc. A sine wave pattern is formed, by vapor deposition, on the code disc. This pattern allows an area of a transparent portion of the disc to vary in a sine wave form of one period through one complete revolution of the shaft. The light emitting element produces an electrical signal (A-phase pulse signal) whose amplitude varies in a sine wave, with rotation of the shaft. Further, when a cosine wave pattern, which is displaced in phase from the sine wave pattern by 90°, is formed on the same code disc or another light receiving element is provided at a position displaced 90° therefrom, the light receiving element produces an electrical signal whose amplitude varies in a cosine wave, with rotation of the shaft (electrical signal=B-phase pulse signal).

The light shut-off portion is formed with a sine wave pattern or a sine wave pattern and a cosine wave pattern.

Figure 6:
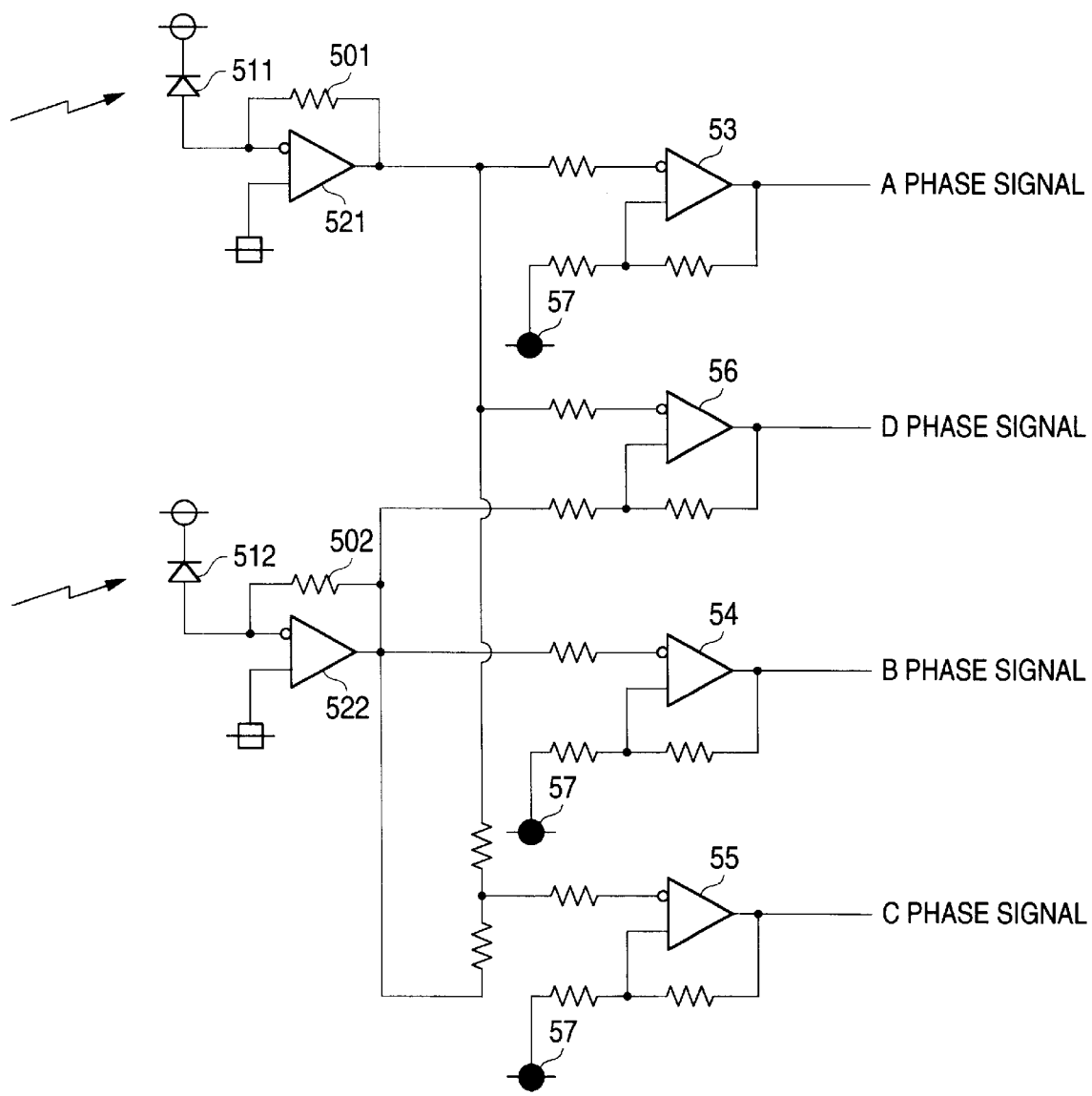
FIG. 6 is a block diagram showing an A-to-D phase forming portion for forming four pulse signals of A-phase, B-phase, C-phase and D-phase in the absolute-value encoder device of the embodiment 2 of the invention.
Figure 7:
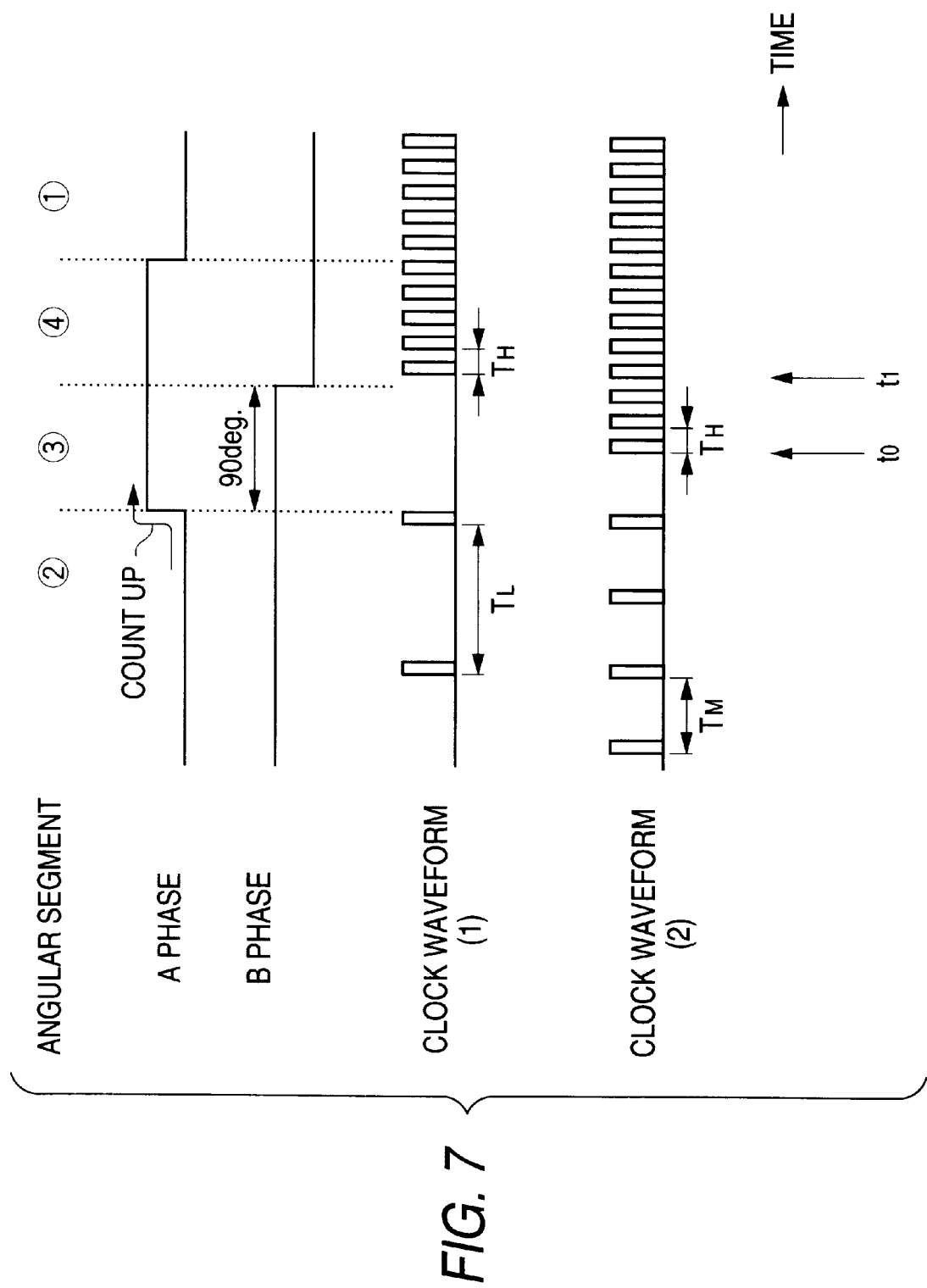
FIG. 7 is a block diagram showing a conventional absolute-value encoder device.
Figure 8:
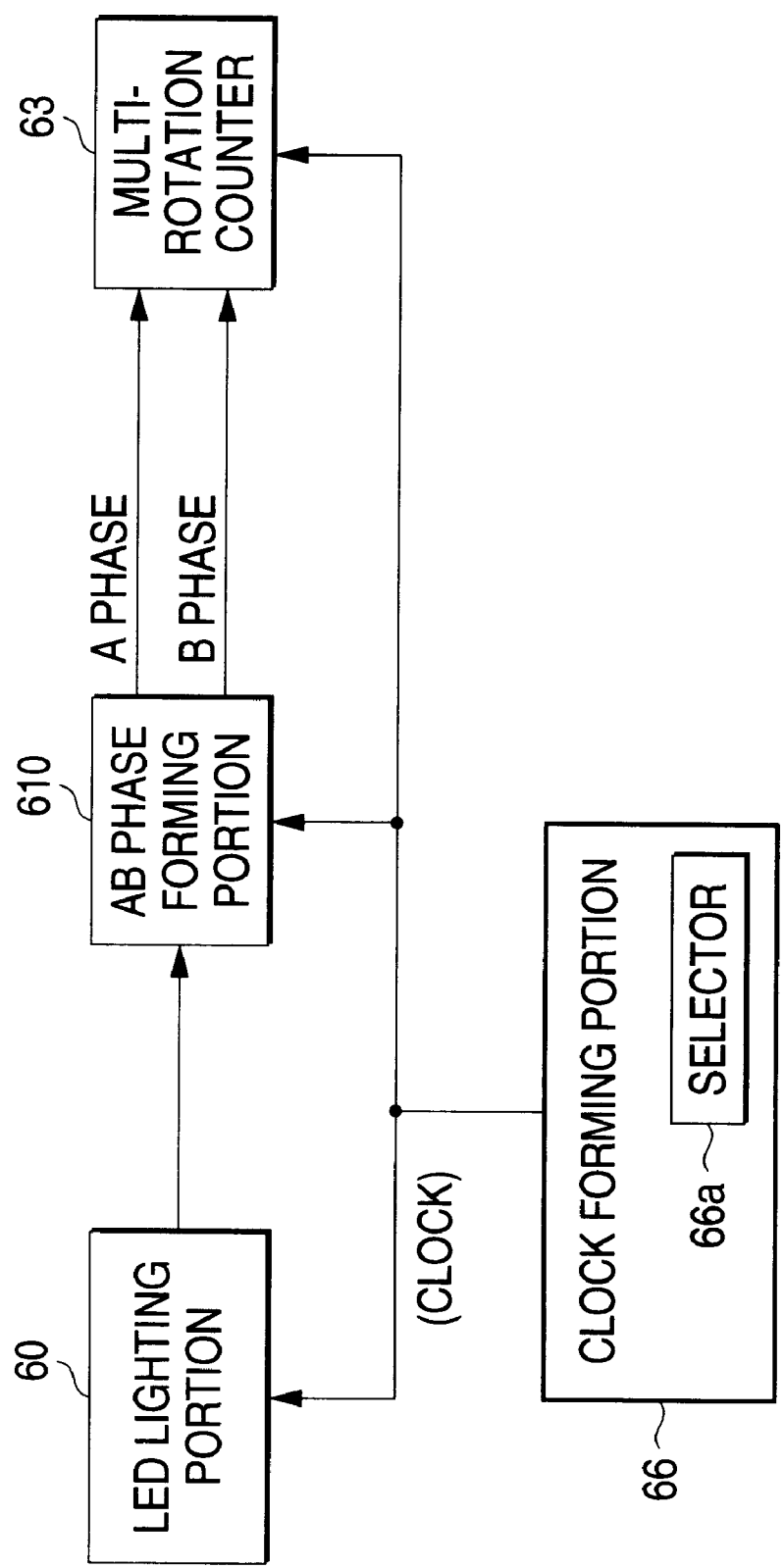
FIG. 8 is a timing chart for explaining a detecting operation of a plurality of rotation quantities in a conventional absolute-value encoder device.

FIG. 6 is a circuit diagram showing the A-to-D phase forming portion 61. When the code disc is rotated with shaft rotation, light varying in a sine wave is irradiated on a light receiving element 511. The light is converted into a corresponding voltage signal by a circuit including the light receiving element 511, an operational amplifier 521 and a resistor 501. The light varying in a cosine wave is irradiated on a light receiving element 512. The light is converted into a corresponding voltage signal by a circuit including the light receiving element 512, an operational amplifier 522 and a resistor 502.

In FIG. 6, a comparator 53 compares a sine wave signal with a reference voltage 57, thereby forming an A-phase pulse signal. A comparator 54 compares a cosine wave signal with a reference voltage 57, thereby forming a B-phase pulse signal. A comparator 55 compares an average voltage of sine and cosine wave signals with a reference voltage 57, thereby forming a C-phase pulse signal. A comparator 56 compares an average voltage of a sine wave signal with a cosine wave signal, thereby forming a D-phase pulse signal.

If required, the D-phase pulse signal may be formed in a manner that the comparator 56 compares an average voltage of a cosine wave signal and an inverted signal of a signal wave signal, which is formed by inverting a sine wave signal by the reference voltage, with the reference voltage.

As shown in FIG. 6, when each of the comparators 53 to 56 is designed to have a hysteresis characteristic, each phase pulse signal may be stabilized at a region near the adjacent angular segments. By so doing, a stable pulse signal is produced also in such a particular case where the present angular position of the shaft stops at a region near the adjacent angular segments. Where the resistance values of the comparator 53 are R1 and R2, and the power source voltage is Vcc, the hysteresis width of the A-phase pulse signal is given by R1×Vcc/(R1+R2).

The A-, B-, C- and D-phase pulse signals may be formed in a manner that four digital slit patterns corresponding to those phase pulse signals are formed on the code disc, and those phase pulse signals may be formed based on the light signals from those slit patterns. Also in this case, more stable pulse signals may be produced by giving the pulse wave shaping circuit a hysteresis characteristic.

To form those phase pulse signals, four light receiving elements may be arrayed in the rotational direction of the shaft. In this case, a reduced number of the patterns formed on the code disc is required.

Embodiment 3

While in the embodiment described above, a plurality of rotation quantities are detected by using four pulse signals, an embodiment 3 of the invention detects a plurality of rotation quantities by using a total of six pulse signals; a fifth pulse signal, e.g., an E-phase pulse signal and a sixth pulse signal, e.g., an F-phase pulse signal in addition to the phase pulse signals described above.

The E-phase pulse signal leads the A-phase pulse signal by a predetermined angle of 45° or smaller, e.g., about 22.5°, and the F-phase pulse signal lags the A-phase pulse signal by a predetermined angle of 45° or smaller, e.g., about 22.5°.

With the device construction thus made, the tolerable angular acceleration is further increased. That is, the maximum tolerable angular acceleration is about 7.5 times as large as that in the device using only the A- and B-phase pulse signals when it is computed as in the embodiments 1 and 2 and the phase difference is 22.5°.

Also in this case, a plurality of rotation quantities are detected when a leading or trailing edge of the A-phase pulse signal is detected based on the contents of Table 1, as described above.

The E-phase pulse signal may be formed based on, for example, an average signal of sine and cosine wave signals and a reference voltage by use of a comparator. The F-phase pulse signal may be formed based on an average signal of a cosine wave signal and an inverted signal of a sine wave signal with respect to a reference voltage, and a cosine wave signal, by use of a comparator.

The E- and F-phase pulse signals may be formed in a manner that digital patterns exclusively used for forming those signals are formed on a code disc or that given light receiving elements are additionally provided at two locations separated from each other as viewed in the rotational direction of the shaft.

While the embodiment 3 uses A-, B-, C-, D-, E- and F-phase pulse signals, the absolute-value encoder device may be constructed such that the C- and D-phase pulse signals are not used, and accordingly, Table 1 is also not used, but A-,B-, E- and F-phase pulse signals are used. In this case, as in the embodiment 1, it may be divided into four angular segments that can be specified by the A- and B-phase pulse signals. And in this case, when any of the A-,B-, E- and F-phase pulse signals changes its level, the frequency of the clock pulse signal is changed to the low frequency. By so doing, the tolerable angular acceleration may be increased to be larger than that in the embodiment 1.

The E- and F-phase pulse signals may be substituted by the following pulse signal. Where the B-phase pulse signal is in a predetermined logic level, one of the leading edge or the trailing edge of the pulse signal is located at an angular position, which leads another angular position at which the logic level of the A-phase pulse signal changes, by an angle of 90° or smaller. Where this B-phase pulse signal is in a predetermined logic level, the other of those edges is located at an angular position, which lags another angular position at which the logic level of the A-phase pulse signal changes, by an angle of 90° or smaller. Also in this case, when any of the A- and B-phase pulse signals changes its logic level, the frequency of the clock pulse signal is changed to the high frequency. As in the embodiment 1 of the invention, it may be divided into four angular segments that may be specified by the A- and B-phase pulse signals. By so doing, the tolerable angular acceleration may be increased to be larger than that in the embodiment 1.

While the absolute-value encoder device which receives electric power selectively from the main power supply or the battery was discussed in the embodiments 1 to 3, it is readily understood that the invention may be applied to an absolute-value encoder device driven by the battery alone.

As seen from the foregoing description, the absolute-value encoder device of the invention is well adaptable for a device, such as a positioning device, which is required to normally detect a plurality of rotation quantities (the number of revolutions) of the shaft even in such a situation that the shaft rotates by itself when electric power is not supplied from the main power supply, for example, during the power stoppage. The invention is also applicable to a device of the type in which the shaft is rotated by any other means than electric power, and it is required to detect a plurality of rotation quantities (the number of revolutions) of the shaft.

What is claimed is:

1. An absolute-value encoder device comprising:

a rotary disc rotating with a shaft;

pulse signal forming means for producing first and second pulse signals shifted approximately 90° from each other, each said pulse signal being generated one pulse for each complete revolution of the shaft, based on light passing through a light shut-off portion provided on said rotary disc, wherein there are four angular segments into which angular positions of one revolution of said shaft are divided, each said angular position specified by said first and second pulse signals;

clock generating means for generating a clock pulse signal; and rotation quantity counting means which counts, based on said clock pulse signal, when said first pulse signal changes its logic level while said second pulse signal is in a predetermined logic level, and holds the present value of the number of revolutions of said shaft;

wherein when either of said two pulse signals changes its logic level, said clock generating means changes the frequency of said clock pulse signal to a higher frequency.

2. The absolute-value encoder device according to claim 1, further comprising number-of-clock counting means for counting clock pulses, said number-of-clock counting means being placed in a reset state at a start position of each of said four angular segments, and wherein when a count value of said number-of-clock counting means exceeds a preset value, said clock generating means changes the frequency of said clock pulse signal to a lower frequency.

3. The absolute-value encoder device according to claim 1, wherein said pulse signal forming means outputs a predetermined number of pulse signals in addition to said first and second pulse signals, said clock generating means changes the frequency of said clock pulse signal to a higher frequency when any of said first and second pulse signals and said predetermined number of pulse signals changes its logic level, and either of the leading or trailing edges of each of said predetermined number of pulse signals leads an angular position where said first pulse signal changes its logic level by a predetermined angle of 90° or smaller while said second pulse signal is in a predetermined logic level, and either of the leading or trailing edges of each of said predetermined number of pulse signals lags an angular position where said first pulse signal changes its logic level by a predetermined angle of 90° or smaller while said second pulse signal is in a predetermined logic level.

4. An absolute-value encoder device comprising:
a rotary disc rotating with a shaft;
pulse signal forming means for producing first, second, third and fourth pulse signals shifted approximately 45° from one another, each said pulse signal being generated one pulse for each complete revolution of the shaft, based on light passing through a light shut-off portion provided on said rotary disc, wherein there are eight angular segments into which angular positions of one revolution of said shaft are divided, each said angular position being specified by said four pulse signals;
clock generating means for generating a clock pulse signal;
select means for selecting one of said second, third or fourth pulse signals based on said angular segment selected from among said eight angular segments; and
rotation quantity counting means which counts, based on the present clock pulse of said clock pulse signal, when said first signal changes its logic level while said pulse signal selected by said select means is in a predetermined logic level, and holds the present value of the number of revolutions of said shaft.

5. An absolute-value encoder device according to claim 3, wherein said clock generating means for generating a clock pulse signal changes the frequency of said clock pulse signal to a higher frequency when any of said four pulse signals changes its logic level.

6. An absolute-value encoder device according to claim 5, further comprising number-of-clock counting means for counting clock pulses, said number-of-clock counting means being placed in a reset state at a start position of each of said eight angular segments, and wherein when a count value of said number-of-clock counting means exceeds a preset value, said clock generating means changes the frequency of said clock pulse signal to a lower frequency.

7. An absolute-value encoder device according to claim 4, wherein said pulse signal forming means includes four comparators, and generates signals of which the voltage amplitudes vary in sine and cosine wave forms for one period through one complete revolution of said shaft, based on light passing through said light shut-off portion, and forms four pulse signals, first to fourth pulse signals, by using said four comparators based on said generated signals.

8. An absolute-value encoder device according to claim 4, wherein said rotary disc includes four light shut-off portions, the amounts of light passing through said four light shut-off portions are displaced from one another by about 45°, each of said four light shut-off portions varies in a one-pulse shape through one revolution of said shaft, and said pulse signal forming means outputs four signals, first to fourth pulse signals, based on said amounts of said light having passed.

9. An absolute-value encoder device according to claim 4, wherein said pulse signal forming means outputs a total of six pulse signals, a fifth pulse signal and a sixth pulse signal in addition to said four pulse signals, and said fifth pulse signal leads said first pulse signal by an angle of 45° or smaller and said sixth pulse signal lags said first pulse signal by an angle of 45° or smaller.

10. An absolute-value encoder device according to claim 9, wherein said clock generating means for generating a clock pulse signal changes the frequency of said clock pulse signal to a higher frequency when any of said four pulse signals changes its logic level.

11. An absolute-value encoder device according to claim 10, further comprising number-of-clock counting means for counting clock pulses, said number-of-clock counting means being placed in a reset state at a start position of each of said eight angular segments, and wherein when the number of clock pulses exceeds a preset value, said clock generating means changes the frequency of said clock pulse signal to a low frequency.

12. An absolute-value encoder device according to claim 9, wherein said pulse signal forming means includes six comparators, and generates signals of which the voltage amplitudes vary in sine and cosine wave forms for one period through one complete revolution of said shaft, based on light passing through said light shut-off portion, and forms six pulse signals, first to sixth pulse signals, by using said four comparators based on said generated signals.

13. An absolute-value encoder device according to claim 9, wherein said rotary disc includes first to fourth light shut-off portions, the amounts of light passing through said first to fourth light shut-off portions being displaced from one another by approximately 45°, each of said first to fourth light shut-off portions varying in a one-pulse shape through one revolution of said shaft, and said rotary disc further includes a fifth light shut-off portion of which the amount of light passing therethrough leads the corresponding light having passed through said first light shut-off portion by an angle of 45° or smaller, and a sixth light shut-off portion of which the amount of light having passed therethrough lags the corresponding light having passed through said first light shut-off portion by an angle of 45° or smaller, and said pulse signal forming means outputs four signals, first, second, fifth, and sixth pulse signals, based on said amounts of said light passing through said sixth light shut-off portions.

* * * * *